United States Patent [19]
Kato

[11] Patent Number: 6,141,111
[45] Date of Patent: Oct. 31, 2000

[54] IMAGE PRINTING SYSTEM AND IMAGE PRINTING METHOD

[75] Inventor: Hiroyuki Kato, Chiba-ken, Japan

[73] Assignee: Kabushiki Kaisha Toshiba, Kawasaki, Japan

[21] Appl. No.: 09/110,416

[22] Filed: Jul. 6, 1998

[30] Foreign Application Priority Data

Jul. 8, 1997 [JP] Japan ..................... 9-182633

[51] Int. Cl.⁷ ..................................................... G06F 15/00
[52] U.S. Cl. .......................... 358/1.15; 358/296; 358/402; 358/403; 358/468; 382/317; 399/84
[58] Field of Search ................................. 358/1.12, 1.13, 358/1.14, 1.15, 296, 483, 479, 487, 402, 403, 407, 468; 382/317; 399/84; 396/429; 355/40, 41

[56] References Cited

U.S. PATENT DOCUMENTS

| 5,499,113 | 3/1996 | Tsuboi et al. | 358/479 |
| 5,563,956 | 10/1996 | Nishikawa et al. | 382/118 |
| 5,829,044 | 10/1998 | Sono | 711/156 |
| 5,926,285 | 7/1999 | Takahashi | 358/296 |

FOREIGN PATENT DOCUMENTS 7-306933  11/1995  Japan .

Primary Examiner—Edward L. Coles
Assistant Examiner—Mark Wallerson
Attorney, Agent, or Firm—Foley & Lardner

[57] ABSTRACT

An image printing system includes an image forming apparatus comprising a digital still camera to take images and store the taken images by converting them into electronic information, a scanner to read document images, image forming units to form document images read by the scanner on recording media and a sorter to sort the recording media with images formed thereon. The image printing system further includes a designation medium to designate a first information designating image to be printout to recording media out of those images taken by a digital still camera, a second information designating the number of recording media on which images are to be printed and a third information designating the sorting of recording media on which images are output. The image printing system further includes a controller to control the image forming apparatus so that the contents of the designation on the designating medium are read by the scanner of the image forming apparatus and according to the read contents of the designation on the designation medium, image information designated by the first information on the designation medium out of image information stored in the digital still camera is formed on a plurality of recording media according to the number of copies designated by the second information and the recording media with the image formed are sorted by the sorter according to the third information.

12 Claims, 12 Drawing Sheets

| USER GROUP | USER GROUP ID |
|---|---|
| GROUP A | ABC12345 |
| GROUP B | DEF67890 |
| GROUP C | GHI54321 |

FIG. 3A

| USER | USER ID | USER GROUP ID | IMAGE DISPLAY |
|---|---|---|---|
| USER A | A596C | ABC12345 | - |
| USER B | B435A | - | IMAGE DISPLAY A |
| USER C | C431D | DEF67890 | IMAGE DISPLAY B |

FIG. 3B

| IMAGE PRINTER | IMAGE PRINTER NETWORK ADDRESS |
|---|---|
| IMAGE PRINTER A | 123.456.789.1 |
| IMAGE PRINTER B | 123.456.789.2 |
| IMAGE PRINTER C | 123.456.789.3 |

FIG. 3C

| IMAGE DISPLAY | IMAGE DISPLAY NETWORK ADDRESS |
|---|---|
| IMAGE DISPLAY A | 987.654.321.1 |
| IMAGE DISPLAY B | 987.654.321.2 |
| IMAGE DISPLAY C | 987.654.321.3 |

FIG. 3D

| IMAGE PRINTER | INSTALLED POSITION | PRINTER TYPE | PRINTED IMAGE DEFINITION | ALLOWABLE PRINT SIZE |
|---|---|---|---|---|
| IMAGE PRINTER A | 4F A ZONE | COLOR DIGITAL COPIER | 600dpi | A3 |
| IMAGE PRINTER B | 2F C ZONE | COLOR INK-JET PRINTER | 360dpi | A3 |
| IMAGE PRINTER C | 3F D ZONE | COLOR SUBLIMINATION-TYPE PRINTER | 600dpi | A6 |

FIG. 10

| IMAGE DISPLAY | PRINTER TYPE | PRINTED IMAGE DEFINITION | ALLOWABLE PRINT SIZE |
|---|---|---|---|
| IMAGE DISPLAY A | 0.8 | 0.8 | 0.8 |
| IMAGE DISPLAY B | 0.6 | 0.5 | 0.8 |
| IMAGE DISPLAY C | 0.7 | 0.8 | 0.6 |

FIG. 11

IMAGE PRINTING SYSTEM AND IMAGE PRINTING METHOD

BACKGROUND OF THE INVENTION

1. Field of the Invention

The present invention relates to an image printing system and an image printing method capable of providing various designations relative to the extra-copy printing using, for instance, an extra-copy designation sheet.

2. Description of the Related Art

Recently, various developments have been made in connection with "Digital Still Camera" which is used for preserving still images electronically and is widely in use. On a camera using an ordinary silver film, an image is recorded as a chemical change on that film and requires a chemical treatment when developing the film. On the contrary, a digital still camera converts an image into electrical signals using a CCD (Charge Coupled Device) instead of a film and records the electrical signals as an image file. So, when using, for instance, a liquid crystal display, etc., there is such a merit that a desired image can be read from a recorded file and checked on the place where it is taken. Furthermore, there is also such a merit that a taken image becomes directly an image file and it is easy to take it into a hard disk, etc. of a personal computer.

A general digital still camera is composed of a CPU (Central Processing Unit) to control the entirety, a CCD to convert optical image data into electronic image data, an image compressing portion to compress image data, a memory to store image data, interface portions to exchange image data with outside equipment, etc. As a memory, for instance, a flash memory card (ATA standard PC card memory, etc.), built-in memory and the like are adopted.

Further, on a digital still camera, the image data exchange is performed primarily through a serial interface or by removing a PC card memory from a digital still camera and directly connecting it to a personal computer which has an interface of said PC card memory at present.

Further, some of digital still cameras are equipped with a function to select so-called "Economy Mode" and "High Image Quality Mode". In the Economy Mode, as an image compression ratio is increased and a image file size is made small, it becomes possible to record many image data in a memory of limited capacity. On the other hand, in the High Image Quality mode, as the compression ratio is suppressed, the image file size becomes large but it becomes possible to obtain high image quality.

Image data thus obtained using a digital still camera of such a conventional technique are transferred to a personal computer that is connected to the digital still camera through a communication interface. And in the personal computer, various data processes desired by user are carried out. Thereafter, the processed data are transferred to a color ink-jet printer, color sublimation type printer, color copier, etc. and printed therein.

In addition, various printers designed for exclusive use by digital still cameras for transferring image data taken by digital still cameras directly to an image output apparatus for printing without providing to a personal computer have been put in the market recently.

However, there was such a problem that the output environment for printing images obtained by digital still cameras were not yet arranged sufficiently. Further, when color printers for personal computers such as, for instance, ink-jet printers or sublimation type printers for exclusive use for digital cameras are used, there were such problems that much time was needed for printing and much more costs than silver film photographs were required.

Furthermore, when printing a large quantity of color copies using various printers as in the extra-copy printing of silver film photographs, there is such a problem that much more time is needed for the processing. Further, the printing speed of color copiers is faster than such printers but a system connecting a color copier with a digital camera from the concept of "Extra-Copying" has not yet been realized.

On the other hand, the image data editing using a personal computer is able to perform a complicated editing process as described above but on the contrary, labor and time are also needed in addition to special knowledge until output images are finally obtained.

SUMMARY OF THE INVENTION

It is an object of the present invention to achieve a unified structure of a color copier and a digital still camera and provide an image printing system and an image printing method capable of performing a prescribed editing process and printing rapidly and easily by simple operations requiring no special knowledge.

According to the present invention, an image printing system is provided. The image printing system comprises means for taking images and storing the taken images by converting into electronic information; an image forming apparatus comprising reading means to read document images, image forming means to form the document images read by the reading means on recording media, and sorting means to sort the recording media carrying images formed by the image forming means; designation means for designating a first information to designate images to be output to recording media out of images taken by the image taking means, a second information to designate the number of recording media on which images are to be output and a third information to sort the recording media carrying output images; and control means for controlling the image forming apparatus so as to have the reading means of the image forming apparatus read the contents of the designation by the designation means, and according to the contents of the read designation by the designation means, form an image information designated by the first information out of the image information stored in the image taking means on a plurality of recording media in the number of sheets designated by the second information and sort the recording media carrying the image formed thereon by the sorting means according to the third information.

BRIEF DESCRIPTION OF THE DRAWINGS

FIGS. 3A to 3D are diagrams showing the contents of information stored in each of management data portions in the first embodiment;

FIG. 10 is a diagram for explaining an example of a method to decide an optimum image printer in the fourth embodiment;

FIG. 11 is a diagram for explaining an example of another method to decide an optimum image printer in the fourth embodiment;

DESCRIPTION OF THE PREFERRED EMBODIMENTS

Hereinafter, the preferred embodiments of the present invention will be described with reference to the attached drawings.

Figure 1:
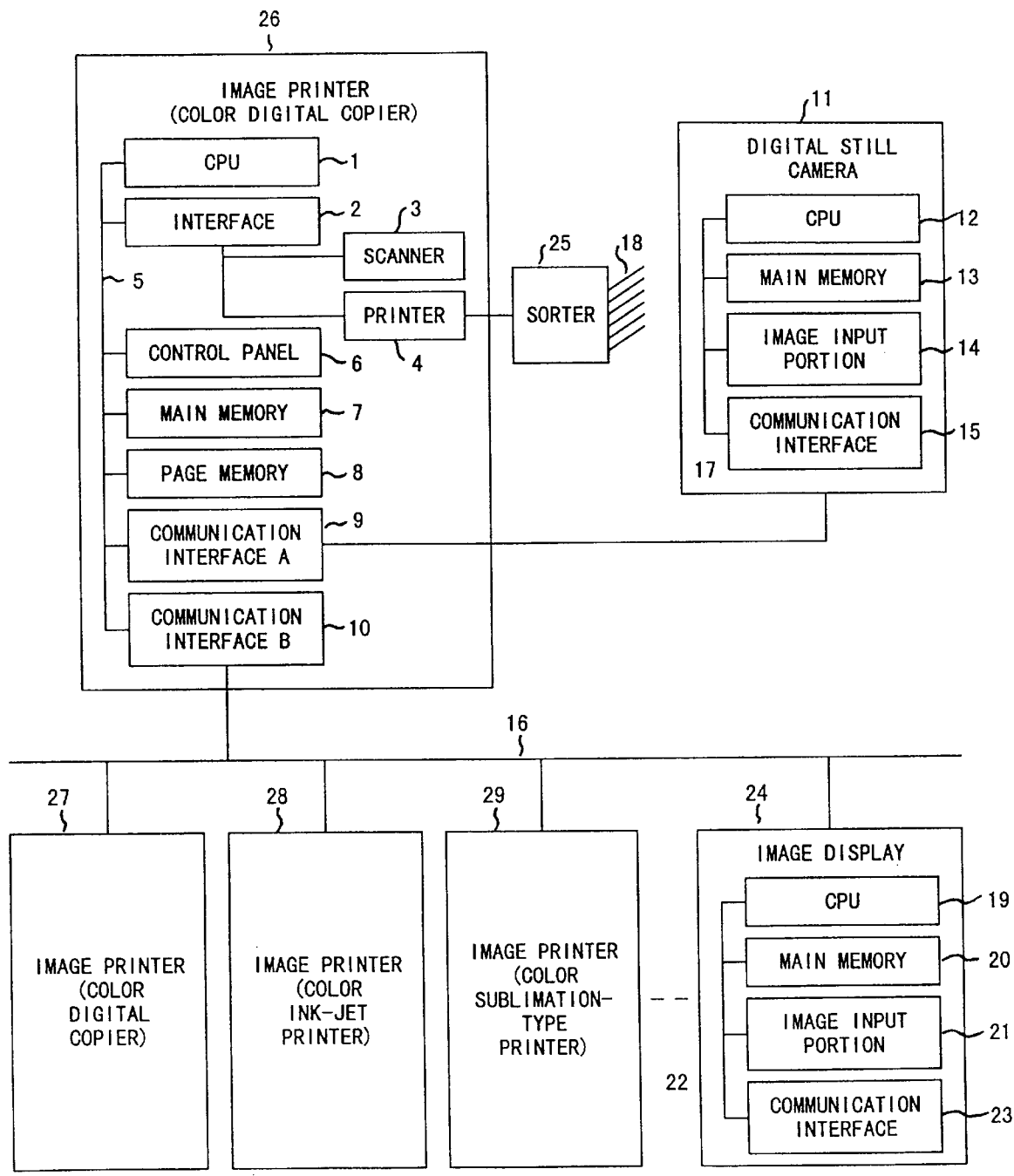
FIG. 1 is a block diagram of an image printing system showing a first embodiment of the present invention.

FIG. 1 is a block diagram of an image printing system involved in a first embodiment of the present invention.

As shown in FIG. 1, this image printing system is compose of mainly an image printer 26, a digital still camera 11, an image display 24, image printers 27 through 29 and a sorter 25. The image printer 26 is connected to the image printers 27 through 29, etc. which are nodes in a network 16 such as a LAN (Local Area Network), etc. Further, for instance, a color digital printer, etc. are assumed as the image printer 26 and a color digital printer, a color ink-jet printer, a color sublimation type printer, etc. are assumed as the image printers 26 through 29, respectively, which are installed as nodes in this embodiment. Needless to say, however, it is not limited to these items.

The image printer 26 is constructed attaching importance to a CPU 1 which controls the entirety of the system. That is, this CPU 1 is connected with an interface 2, a control panel 6 which controls key input, a main memory 7 in which a control program and various data are stored. a page memory 8 in which such data as images, etc. handled by the system are temporarily stored, a communication interface A 9 to exchange information with the digital still camera 11, a communication interface B 10 to exchange information with various image printers through the network 16, etc. by way of a system bus 5. The interface 2 controls input/output of image data for a scanner 3 and a printer 4 which are connected thereto. Further, at the exit portion of the printer 4, there are provided the sorter 25 which sorts and outputs printed paper and a bin 18 which is an inlet portions of the sorted paper.

The inside of the digital still camera 11 is constructed centering around a CPU 12 which controls the operation of each portion. That is, this CPU 12 is connected with a main memory 13 in which a control program and various data are stored, an image input portion 14 comprising, for instance, a CCD, etc. and a communication interface 15 which exchanges information with the image printer 26 by way of a system bus 17.

The inside of the image display 24 is constructed centering around a CPU 19 which controls the operation of each portion of the image display 24. That is, this CPU 19 is connected with a main memory 20 in which a control program and various data are stored, an image output portion 21 which outputs (displays) images stored in the main memory 20, a communication interface 23 which exchanges information through the network 16, etc. by way of a system bus 22. Further, as the image output portion 21, for instance, an LCD (liquid Crystal Display), etc. are adopted.

Figure 2:
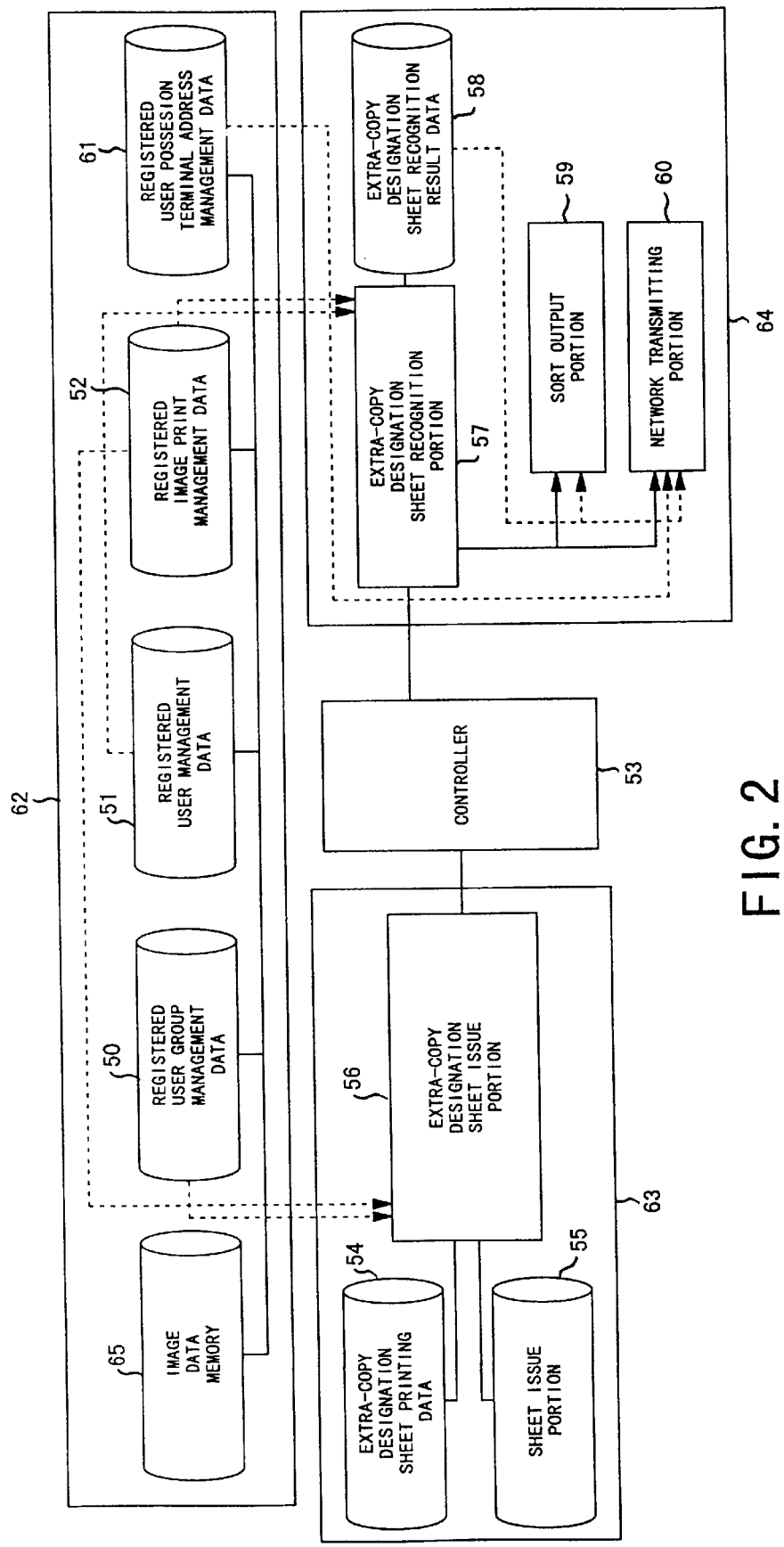
FIG. 2 is a block diagram showing the construction of a software stored in a main memory of an image forming apparatus in the first embodiment.

FIG. 2 shows the structure of a software of this system stored in the main memory 7 of the image printer 26. As shown in FIG. 2, various data of a management data portion 62, a sheet issue portion 63 and a sheet recognition portion 64 are stored in the main memory 7 shown in FIG. 1.

The management data portion 62 is composed of a registered user group management data portion 50, a registered user management data portion 51, a registered image print management data portion 52, a registered user possession terminal address management data portion 61 and an image data memory 65.

The registered user group management data portion 50 is a data base for pre-defining user groups and storing ID Numbers of user groups linked with ID Numbers of corresponding individual users. That is, "Group A", which is a user group name and "ABC 12345", which is a user group ID Number corresponding to that user group name, etc. are stored in this registered user group management data portion 50 as shown in FIG. 3A.

The registered user management data portion 51 is a data base for storing pre-registered user management data. That is, such data as "Group A" which is a user name, "A596C" which is a corresponding user ID Number, "ABC12345" which is a user group ID Number, "Image Display A" which is an image display name are stored in this registered user management data portion 51 as shown in FIG. 3B.

The registered image print management data portion 52 is a data base for storing network addresses of image printers required in selecting destinations of image prints. That is, such data as "Image Printer A" which is an image printer name, "123. 456. 789. 1" which is a network address of a corresponding printer name are stored in this registered image print management data portion 52 as shown in FIG. 3C.

The registered user possession terminal address management data portion 61 is a data base which is linked with the registered user management data portion 51 and for storing network addresses of image displays designated by registered users. That is, such data as "Image Display A" which is an image display name, and "987. 654. 321. 1" which is a network address of a corresponding image display are stored in the registered user possession terminal address management data portion 61 as shown in FIG. 3D.

In addition, the image data memory 65 is for storing image data received from the digital still camera 11 shown in FIG. 1.

On the other hand, the sheet issue portion 63 is composed of an extra-copy designation sheet printing data portion 54, an extra-copy designation sheet serial number management data portion 55 and an extra-copy designation sheet issue portion 56. This extra-copy designation sheet printing data portion 54 is a data base for receiving data from the management data portion 62 and storing data to be printed on an extra-copy designation sheet. Further, the extra-copy designation sheet serial number management data portion 55 is a data base for storing a serial number of an extra-copy designation sheet whenever the extra-copy designation sheet is generated in the extra-copy designation sheet issue portion 56. Further, the extra-copy designation sheet issue portion 56 issues the extra-copy designation sheets based on data stored in the extra-copy designation sheet print management data portion 54 and at the same time, issues serial numbers.

The sheet recognition portion 64 is composed of an extra-copy designation sheet recognition portion 57, an extra-copy designation sheet recognition result data portion 58, a sorter output portion 59 and a network transmitting portion 60. This extra-copy designation sheet recognition portion 57 recognizes the recorded contents of each part of the extra-copy designation sheet, stores the recognition result in the extra-copy designation sheet recognition result data portion 58, sorts the recognition result and transmits the sorted extra-copy image data to the sorter output portion 59 and the network transmitting portion 60. Further, the extra-copy designation sheet recognition result data portion 58 is a data base for storing the result recognized by the extra-copy designation sheet recognition portion 57. Further, the sorter output portion 59 is for printing the sorted image data from the extra-copy designation sheet recognition portion 57, sorting and outputting the printed image data to the sorter 25.

Next, an example of the, construction of an extra-copy designation sheet is shown in FIG. 4.

Figure 4A:
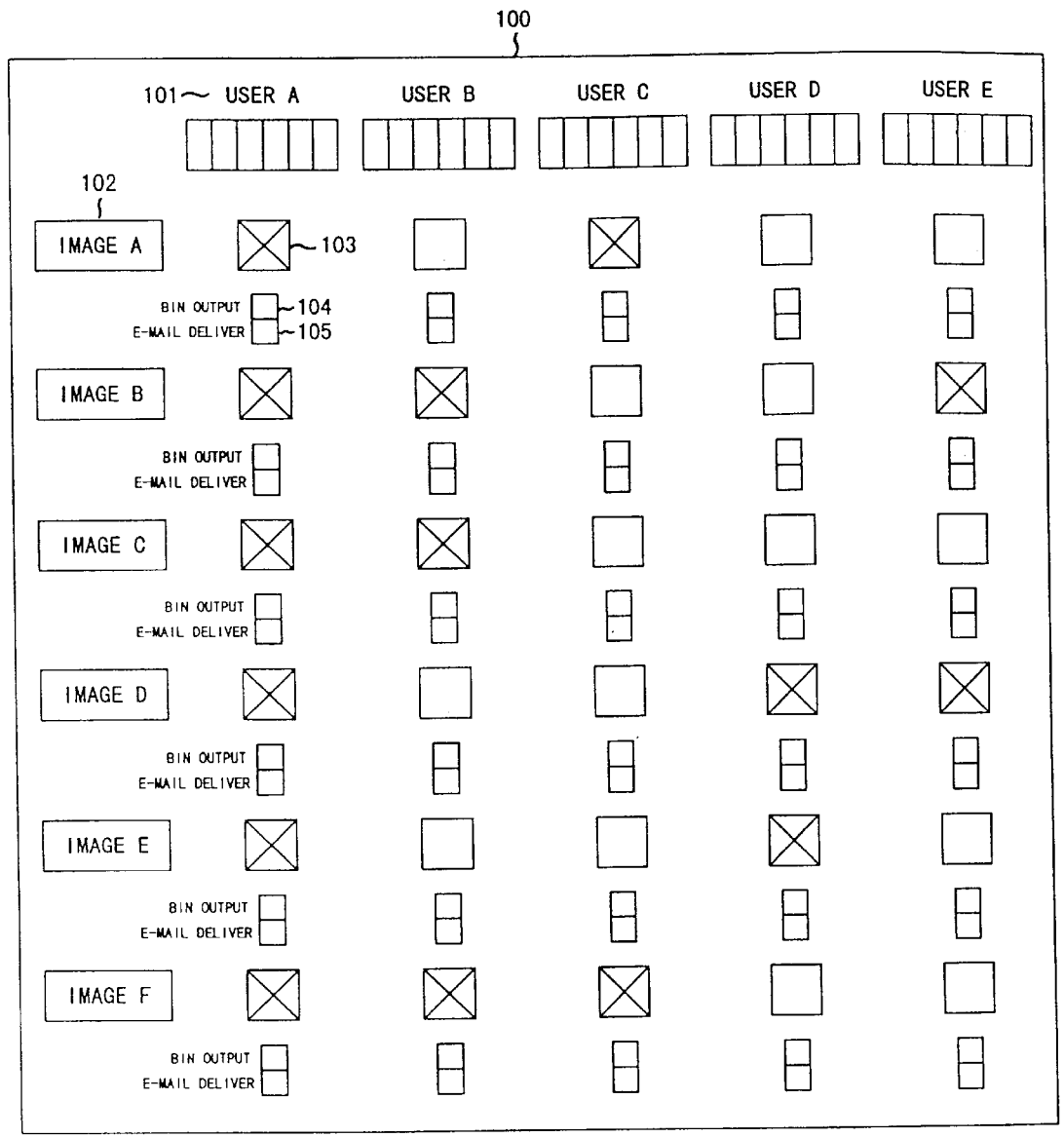
FIGS. 4A and 4B are diagrams showing the detailed constructions of extra-copy designation sheets that are used in the first embodiment.

As shown in FIG. 4A, at the prescribed positions of an extra-copy designation sheet 100, there are arranged a user ID input portion 101, a bin output selection portion 104, an E-mail deliver selection portion 105, an image index portion 102 and an extra-copy check portion 103.

The bin output selection portion 104 and the E-mail delivery selection portion 105 are the portions to select the bin output to the bin 18 or the E-mail delivery to the image display 24 and other image printers 27 through 29 by way of the network 16. When such selection is desired, an operator himself write a mark on the sheet. At this time, it is also possible to select both of them and if so, a mark is entered for both of the bin output and the E-mail delivery.

Figure 4B:

The image index portion 102 is a portion to print the image data taken by the digital still camera 11 in a reduced image. The extra-copy check portion 103 is a portion to check data corresponding to the desired extra-copy printing. Further, it is also possible to hand write a figure of desired number of extra copies as shown in FIG. 4B. In this case, the CPU 1 of the image printer 26 recognizes the annotated number of sheets automatically and controls the extra-copy printing as prescribed.

Now, the process to produce the extra-copy designation sheet 100 will be described.

Image data taken by the digital still camera 11 is stored in the image data memory 65 of the image printer 26 by way of the communication interface 15 at the digital still camera 11 side and the communication interface A9 at the image printer 26 side. Then, when operator designates the printing of the extra-copy designation sheet 100 using the control panel 6 of the image printer 26, the CPU 1 of the image printer 26 compresses the image data stored in the image data memory 65 at a fixed compression value. The compressed data is transmitted to the extra-copy designation sheet print data portion 54. This compressed data becomes the basis of the image index portion 102.

Then, according to the set number of copies of the image, the user ID input portion 101, the bin output selection portion 104, the E-mail delivery selection portion 105 and the extra-copy check portion 103 of the extra-copy designation sheet 100 are produced and stored in the extra-copy designation sheet printing data portion 54. The sheet printing data in the extra-copy designation sheet printing data portion 54 are transmitted to the extra-copy designation sheet issue portion 56 and according to this information, the extra-copy designation sheet 100 in the above-mentioned structure is printed.

Figure 5:
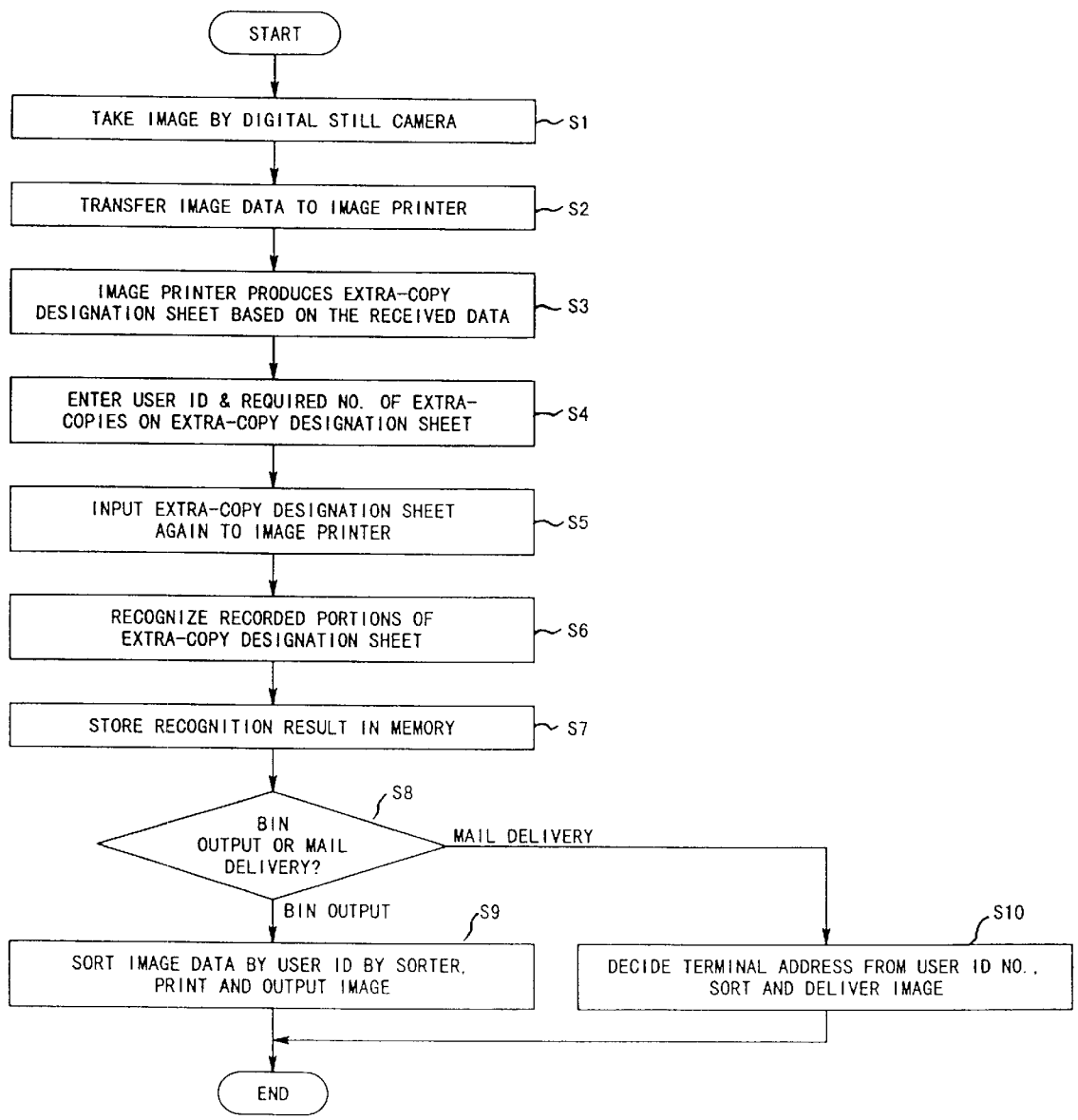
FIG. 5 is a flowchart for explaining the extra-copy printing operation using an extra-copy designation sheet in a second embodiment.

Hereinafter, the extra-copy printing operation using the extra-copy designation sheet 100 according to the first embodiment will be described referring to a flowchart shown in FIG. 5. Further, this operation corresponds to the image printing method of the present invention.

When performing the extra-copy printing according to the image printing system in the first embodiment, a desired subject is first taken by the digital still camera 11 (STEP S1) and the obtained image data are transferred to the image printer via, for instance, a serial cross cable or a PC card memory (the communication interface 15, 9) (STEP S2)

The image printer 26 produces the extra-copy designation sheet 100 in the above-mentioned format in the contents designated by the control panel based on this transferred data or data stored in the management data portion 62 (STEP S3). Then, operator enters a user ID No., the required extra-copy check mark and the number of extra copies onto the produced and output extra-copy designation sheet 100 (STEP S4) and inputs this extra-copy designation sheet into the image printer 26 again (STEP S5).

When the extra-copy designation sheet 100 is thus input, the image printer 26 recognizes the entered data on the sheet, that is, the contents of the user ID input portion 101, the bin output selection portion 104, the E-mail delivery selection portion 105, the image index portion 102 and the extra-copy check portion 103 (STEP S6) and once stores the recognition results in the extra-copy designation sheet recognition result data portion 58 (STEP S7).

Then, based on the data of the bin output selection portion 104 and the E-mail delivery selection portion 105, image data are sorted for transfer to the sorter output portion 59 or the network output portion 60 (STEP S8).

To sort by the bin 18, image data stored in the image data memory 65 are output to the sorter output portion 59. The sorter output portion 59 sorts the image data to each bin 18 based on the recognition result of a user requiring extra copies and the number of extra copies and printed and output (STEP S9). Further, to deliver through the network 16, the image data stored in the image data memory 65 are output to the network transmitting portion 60.

The network transmitting portion 60 performs the delivery through the network 16 based on the recognition result of the network address and the number of extra copies displayed on the image display 24 designated by a user requiring the extra-copy (STEP S10). Thus, a series of extra-copy printing operations is completed.

Next, a second embodiment of the present invention will be described.

The second embodiment is achieved using the image printing system in the construction similar to that of the first embodiment and has a feature shown below. That is, the image printing system involved in this embodiment has a feature that the image printer 26 issues "Serial Number" of the extra-copy designation sheet 100 at the timing to generate the extra-copy designation sheet 100 based on the image data transferred from the digital still camera 11 in the extra-copy printing sequence shown in FIG. 5 (STEP S3).

Such serial number of the extra-copy designation sheet 100 is decided in the detailed contents as shown below based on, for instance, the date and time of the extra-copy designation sheet 100 issued and a registered user ID No.

Date: Feb. 20, 1997
Time: 13:57
Registered User ID No.: A59S

The serial number thus decided based on such the contents will become "199702201357A59S".

Here, the data and time information are obtained according to a means provided in the image printer 26 to know date and time. Further, when image data are transferred from the digital still camera 11, a user has recognized the registered user ID No. in advance and inputs it to the image printer 26. It is considered that such methods are taken as, for instance, user inputs a registered user ID No. through the control panel 6 or the digital still camera 11 has a peculiar number and that peculiar number is transferred to the image printer 26 simultaneously with the image transfer.

Next, a third embodiment of the present invention will be described.

Figure 6:
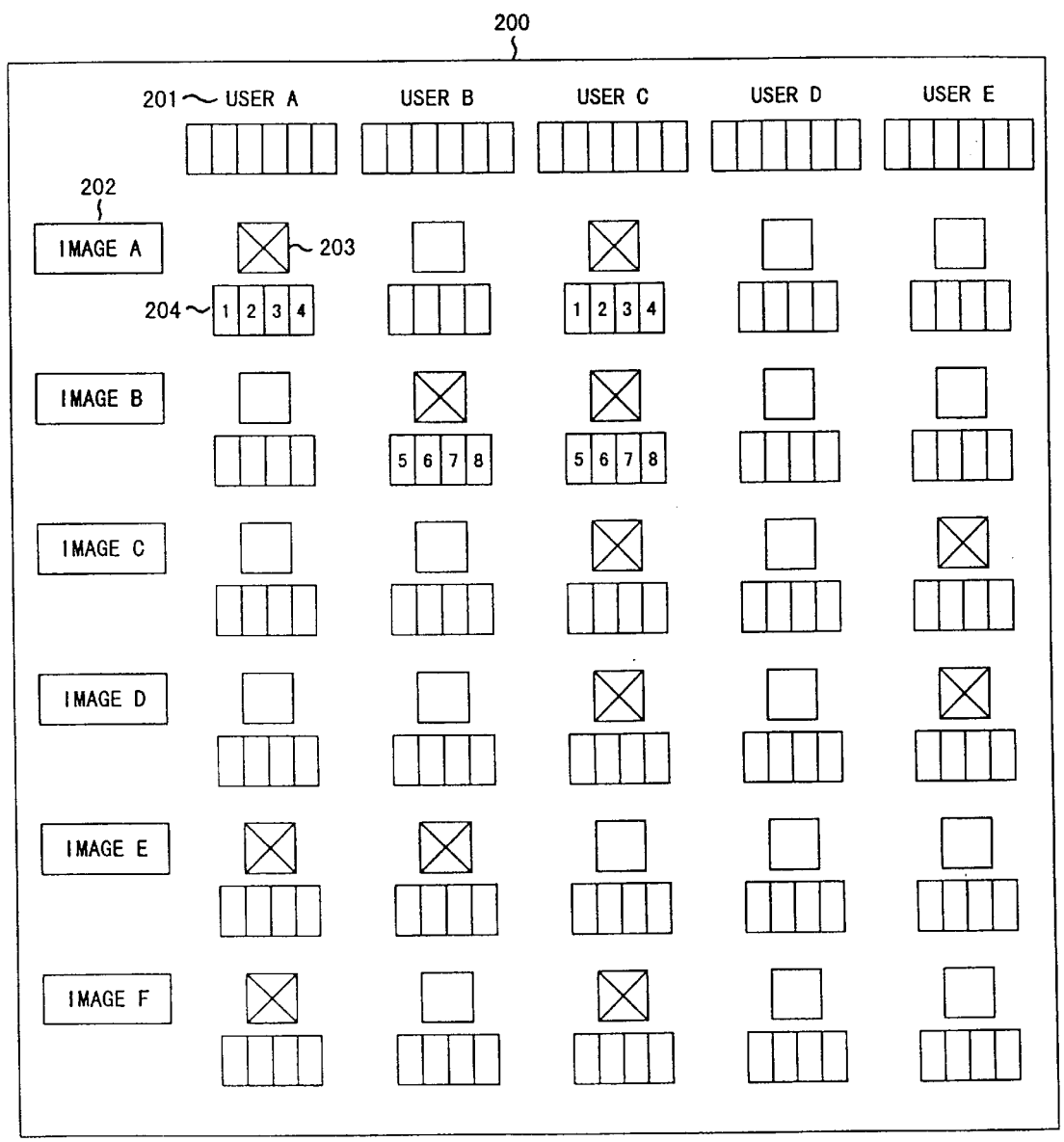
FIG. 6 is a diagram showing the construction of an extra-copy designation sheet that is used in a third embodiment.

FIG. 6 is a diagram showing the construction of an extra-copy designation sheet used in the third embodiment.

An extra-copy designation sheet 200 that is used in the third embodiment differs from the extra-copy designation sheet 100 (FIG. 3) previously shown in the first embodiment in that there is provided an output image printer designation portion 204 capable of designating the transfer to the output image printers 27 through 29 connected to the network 16. This output image printer designation portion 204 is pre-registered in the image printer 26 or is provided for designating a printer that is capable of printing images by a specific ID number. Further, an ID number of an image printer and an address on the network are corresponding each other on the one-to-one basis.

Figure 7:
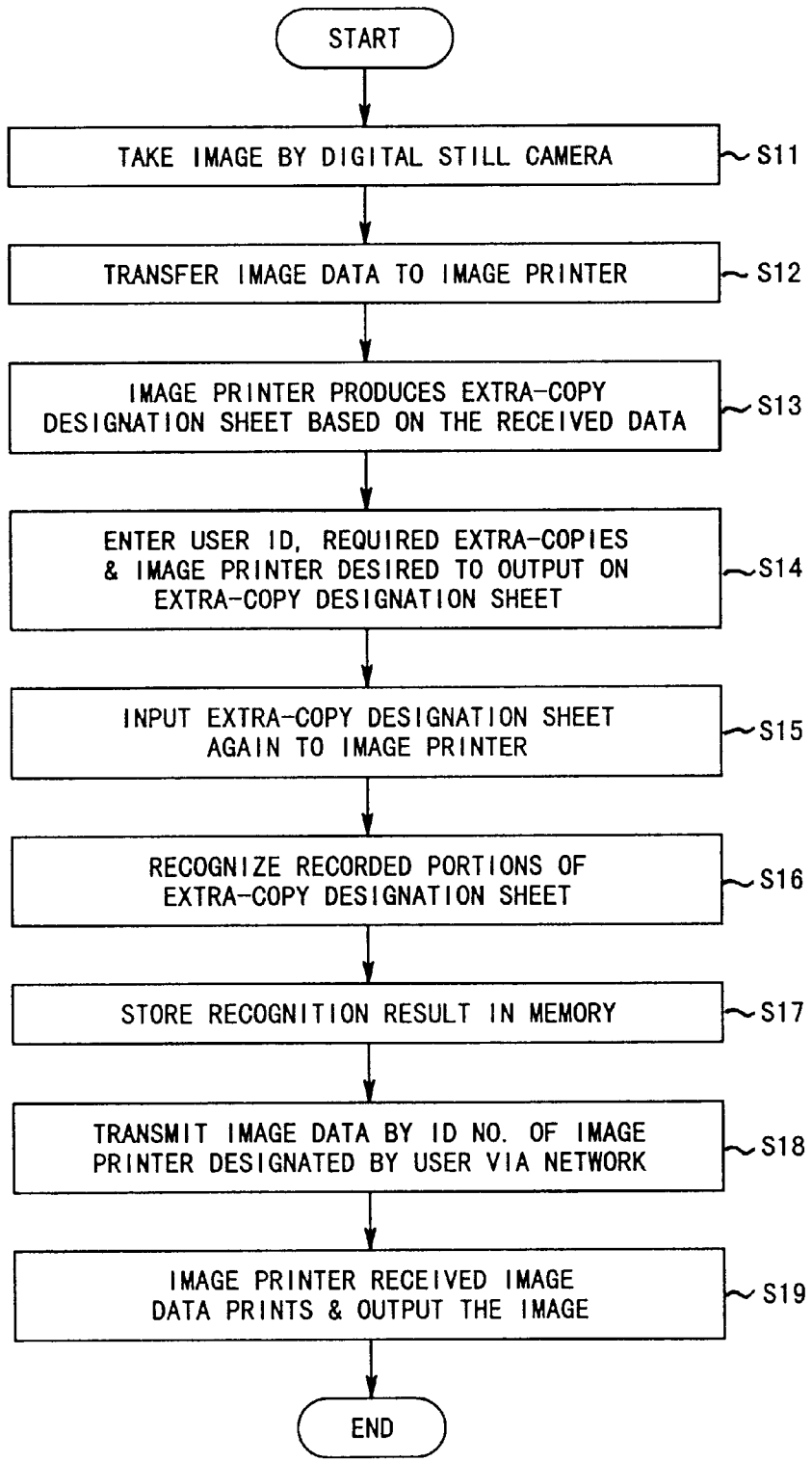
FIG. 7 is a flowchart for explaining the extra-copy printing operation in the third embodiment.

Hereinafter, the extra-copy printing operation in the third embodiment will be described referring to a flowchart shown in FIG. 7. Further, this extra-copy printing operation corresponds to the image printing method of the present invention.

When performing the extra-copy printing according to the image printing system in this embodiment, a desired subject is first taken by the digital still camera 11 (STEP S11) and the obtained image data are transferred to the image printer 26 via, for instance, a serial cross cable or a PC card memory (the communication interface 15, 9) (STEP S12).

Then, the image printer 26 produces and outputs an extra-copy designation sheet 200 designated by operator through the control panel 6 of the image printer 26 based on the transferred data or data stored in the management dataportion 62 (STEP S13).

Then, operator enters desired contents in the user ID input portion 201, the extra-copy check portion 203 and the output image printer designation portion 204 of this output extra-copy designation sheet 200 (STEP S14) and inputs this extra-copy designation sheet 200 into the image printer 26 again (STEP S15).

When the extra-copy designation sheet 200 is thus input, the CPU 1 of the image printer 26 recognizes the contents of the portions of the extra-copy designation sheet 200, that is, the user ID input portion 201, the output image printer designation portion 204 and the extra-copy check portion 203 (STEP S16) and once stores this recognition result in the extra-copy designation sheet recognition result data portion 58 (STEP S17).

Then, based on the data of the output image printer designation portion 204, the image data are transmitted to an image printer designated by user through the network 16 (STEP S18). Upon receipt of this image data, one of the image printers 27 through 29 prints and outputs the image data (STEP S19).

Next, a fourth embodiment of the present invention will be described.

Further, an image printing system in this embodiment of the present invention is in the same construction as that shown in FIG. 1 and therefore, the detailed explanation thereof is omitted and the same reference numerals as those shown in FIG. 1 will be used for the explanation.

Figure 8:
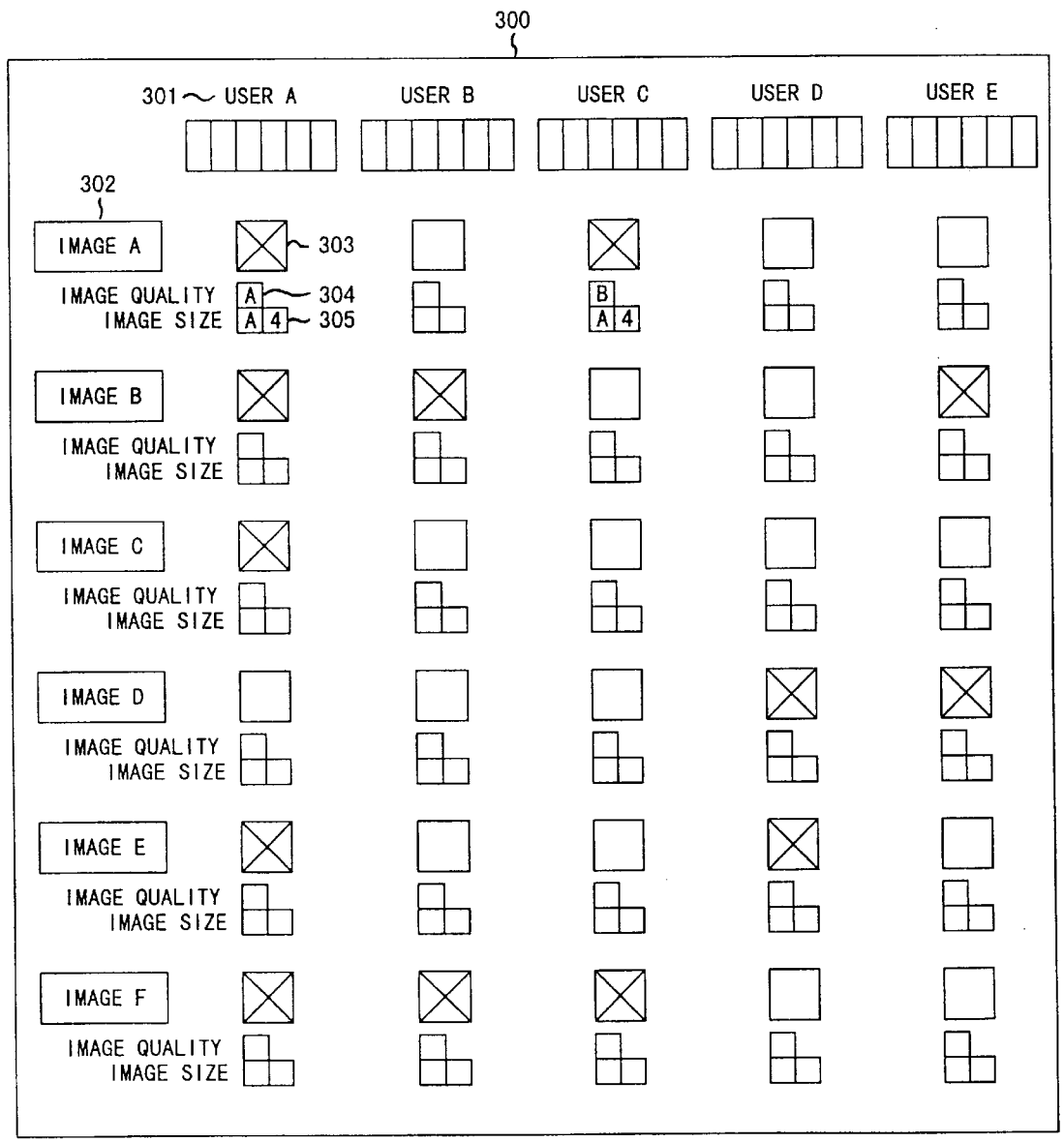
FIG. 8 is a diagram showing the construction of an extra-copy designation sheet in a fourth embodiment.

FIG. 8 is a diagram showing the construction of an extra-copy designation sheet in this fourth embodiment.

An extra-copy designation sheet 300 shown in FIG. 8 differs from the extra-copy designation sheet 100 previously shown in FIG. 4 in that an image quality designation portion 304 for setting image quality and an image size designation portion 305 for setting image size are provided. Further, the image quality designation portion 304 is a portion to designate image quality of printing images, for instance, to designate high quality, standard and draft. In the image quality designation portion 304, "A" is entered for high quality, "B" is entered for standard and "C" is entered for draft. In the image size designation portion 305, such sizes as A3, A4, A5, A6, B4, B5, B6, etc. are entered.

Figure 9:
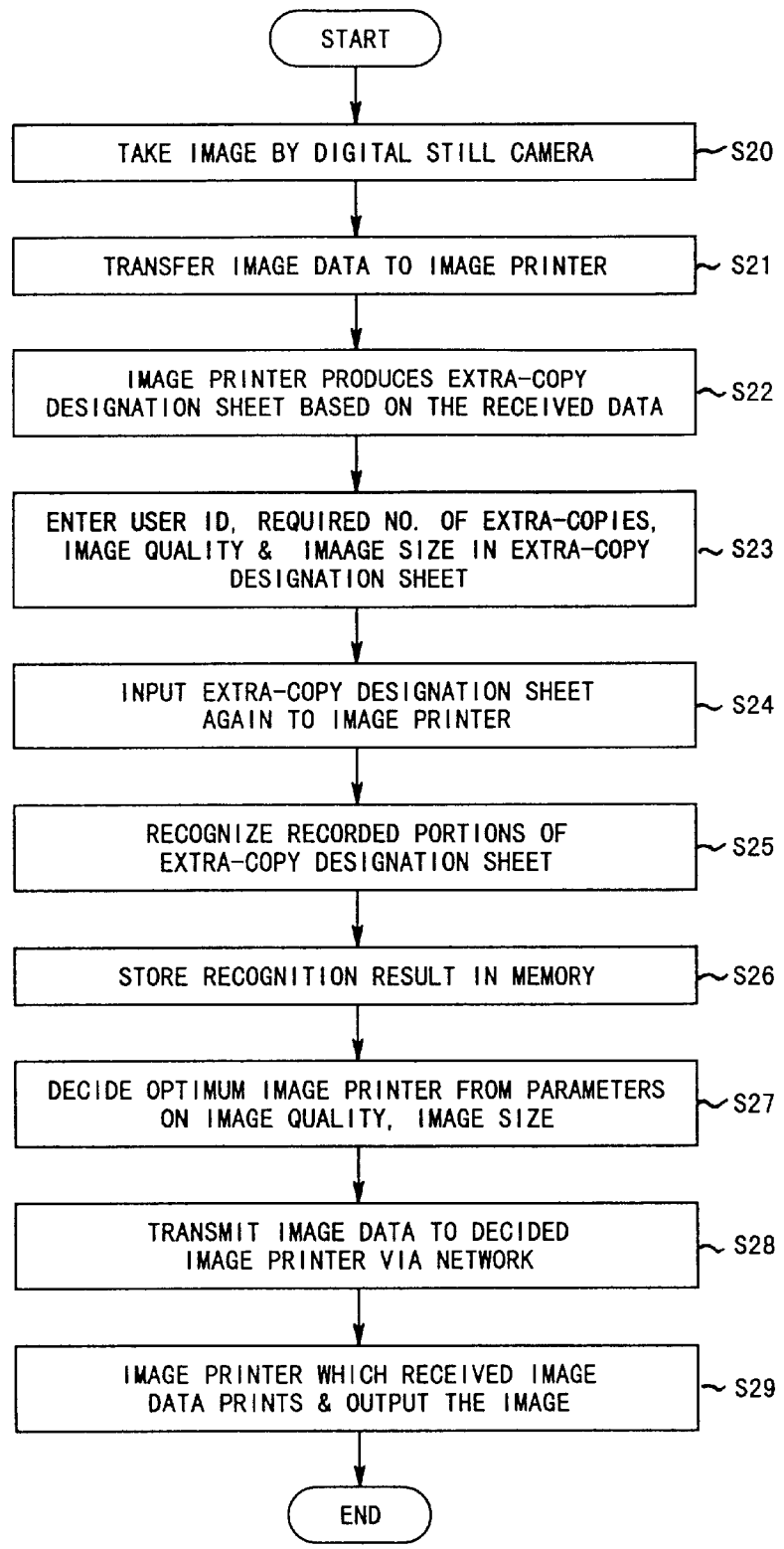
FIG. 9 is a flowchart showing the extra-copy printing sequence in the fourth embodiment.

Hereinafter, the extra-copy printing sequence according to the image printing system in the fourth embodiment will be described referring to a flowchart shown in FIG. 9. Further, this extra-copy printing operation is corresponding to the image printing method of the present invention.

When performing the extra-copy printing, a desired subject is first taken by the digital still camera 11 (STEP S20) and the obtained image data are transferred to the image printer 26 via, for instance, a serial cross cable, a PC card memory (the communication interface 15, 9)(STEP S21).

Then, the image printer 26 produces and outputs the extra-copy designation sheet 300 based on this transferred information (STEP S22). Then, operator enters a user ID number, the extra-copy check, the number of required copies, image quality and image size (STEP S23) and inputs this extra-copy designation sheet 300 to the image printer 26 again (STEP S24).

When this extra-copy designation sheet 300 is input to the image printer 26, the CPU 1 of the image printer 26 recognizes the portions of the extra-copy designation sheet 300, that is, the user ID input portion 301, the image quality designation portion 304, the image size designation portion 305 and the extra-copy check portion 303 (STEP S25) and once store the recognition result in the extra-copy designation sheet recognition result data portion 58 (STEP S26).

Based on the data thus stored in the image quality designation portion 304 and the image size designation portion, the image printers 27 through 29 which are optimum for output are decided (STEP S27) and image data are transmitted to the selected image printer 26 via the network 16 (STEP S28). Then, upon receipt of the selected image data, the image printers 27 through 29 print and output the image data (STEP S29), and a series of the extra-copy printing operations is completed.

Next, an example of a method to decide optimum image printers 27 through 29 will be described referring to FIGS. 10 and 11. In a method adopted in this embodiment, according to the image printers 27 through 29, installed locations, type of printer, resolution of print image, printable size, etc. which are parameters accompanied to them, these parameters are normalized and their values are calculated by evaluation functions and then, a printer is decided referring to the evaluation functional values of the image printers 27 through 29 as shown in FIG. 10.

When, for instance, "High Quality" and "A3" are designated for the image quality and the image size, respectively, by normalizing parameters referring to a table shown in FIG. 10, a normalized parameter table shown in FIG. 11 is obtained.

Then, an evaluation value of each image printer is decided.

Assuming the normalized parameters as α1, α2, ... αn, this evaluation value W is expressed by:

$$W=\alpha 1+\alpha 2+\ldots+\alpha n$$

When these parameters shown in FIG. 11 are substituted into this equation:

Evaluation functional value of Image Printer A:

$$WA=0.8+0.8+0.8=2.4$$

Evaluation functional value of Image Printer B:

$$WB=0.6+0.5+0.8=1.9$$

Evaluation functional value of Image Printer C:

$$WC=0.7+0.8+0.6=2.1$$

As the evaluation value of the image printer A is most high, it is decided to transmit image data to the image printer A.

Next, a fifth embodiment of the present invention will be described.

Figure 12:
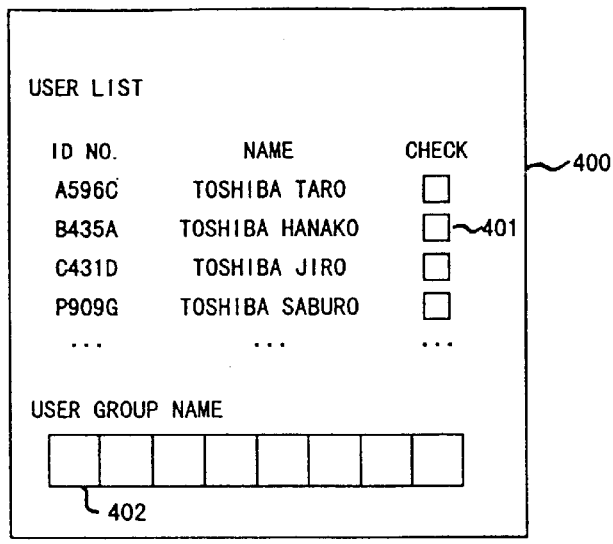
FIG. 12 is a diagram showing the construction of a sheet to register user groups in a fifth embodiment.

FIG. 12 is a diagram showing the construction of a sheet to register a user group.

As shown in FIG. 12, a sheet 400 for registering a user group is generated based on data of the registered user management data portion 51 when the output of a sheet is designated from the control panel of the image printer 26. This sheet 400 is composed of a user list portion 401 and a user group name designation portion 402.

The user list portion 401 shows data stored in the registered user management data portion 51, output in a list format, and has a check column corresponding to each of users so as to put a check mark in a user desired to register in a group. Further, the user group name designation portion 402 is a portion to enter a user group name.

Figure 13:
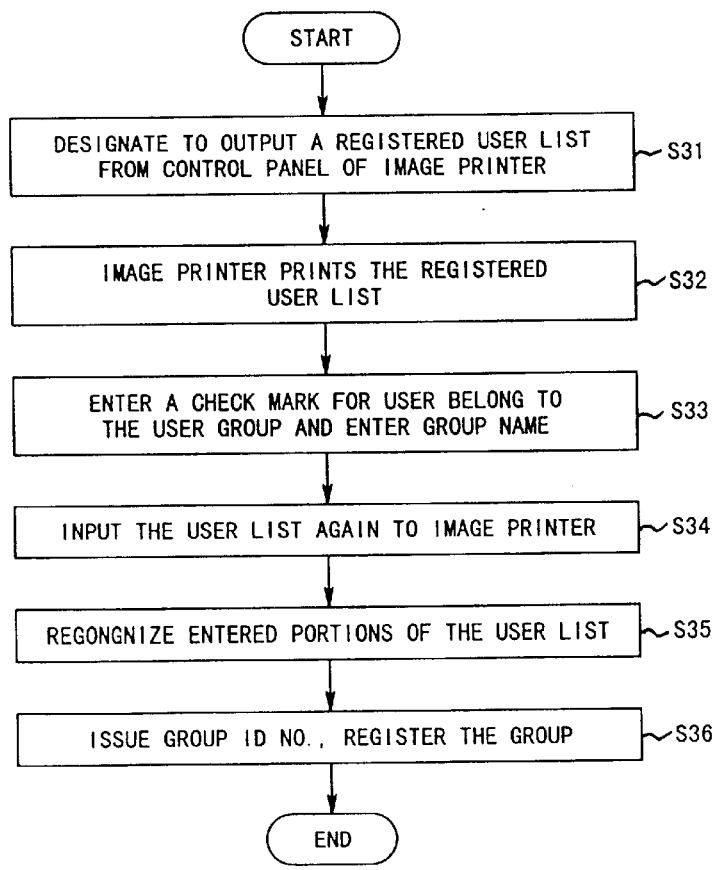
FIG. 13 is a flowchart for explaining the operation to register user groups previously in the fifth embodiment.

Hereinafter, the operation to pre-register a user group will be described referring to a flowchart shown in FIG. 13. First, a user designates the output of a registered user list 400 from the control panel 6 of the image printer 26 (STEP S31). Upon receipt of this designation, the image printer 26 prints a list 400 of the registered users based on the data from the registered user management data portion 51 (STEP S32).

Then, the user checks the check columns of members who desire to form a group and enters a group name (STEP S33). Then, the user inputs the sheet to the image printer 26 again (STEP S34). The image printer 26 recognizes each of the portions of the input sheet (STEP S35), issues a group ID number and registers the recognized group information in the registered user group management data portion 50 (STEP S36).

Figure 14:
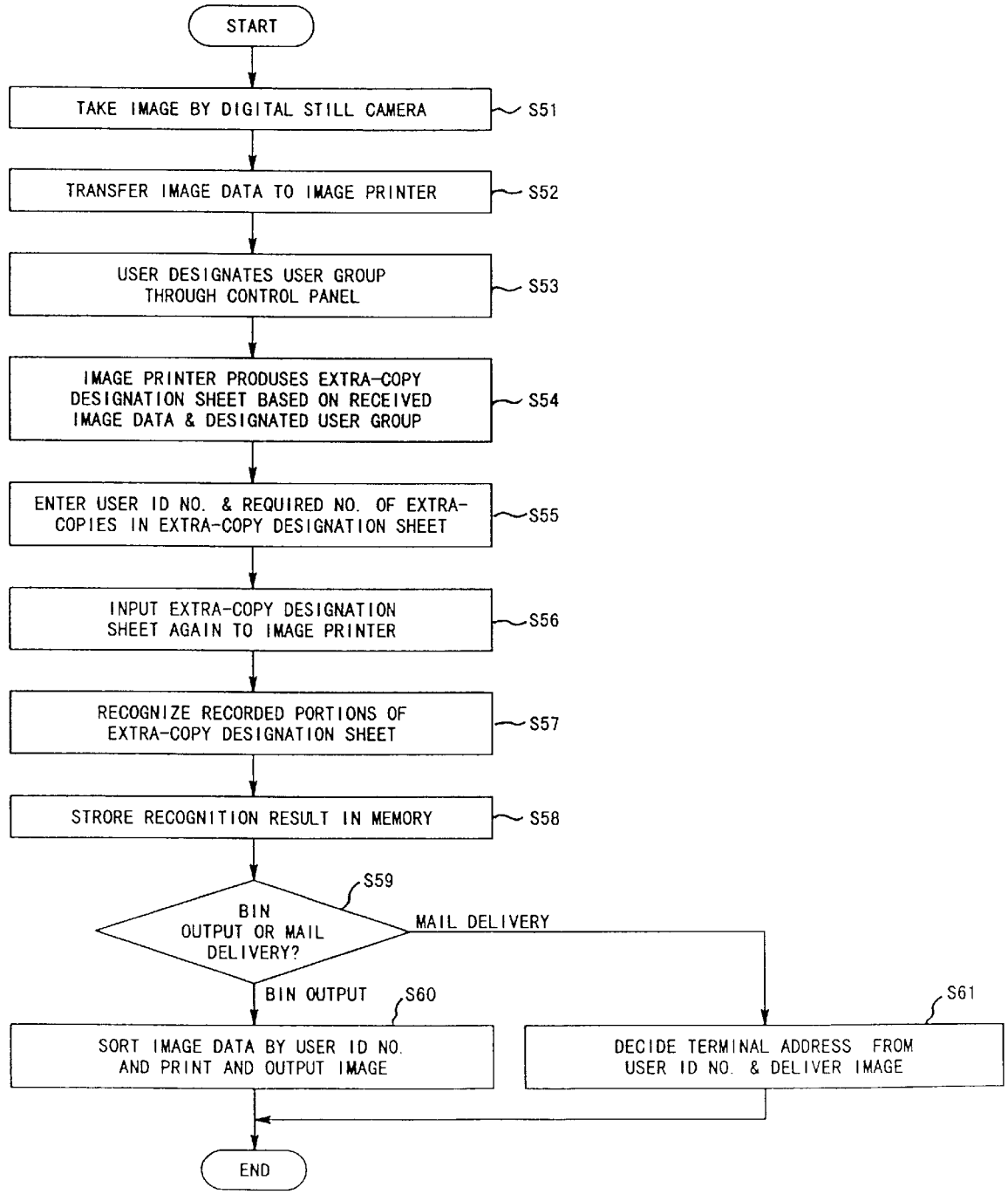
FIG. 14 is a flowchart for explaining the extra-copy printing operation when designating a user group in the fifth embodiment.

Next, the extra-copy printing operation when designating a user group will be described referring to a flowchart shown in FIG. 14. Further, this extra-copy printing operation is corresponding to the image printing method of the present invention.

First, a desired subject is taken by the digital still camera 11 (STEP S51) and image data are transferred to the image printer 26 via, for instance, a serial cross cable or a PC card memory (the communication interface 15, 9) (STEP S52).

Then, a user designates a user group ID number desired to take an order for the extra-copy printing through the control panel of the image printer 26 (STEP S53). The image printer 26 produces an extra-copy designation sheet 100 based on the data transferred from the digital still camera 11, the user group ID number designed by a user through the control panel and the data stored in the management data portion 62 (STEP S54). At this time, the user ID number 101 has been already decided.

The sequences of STEP S55 through STEP S61 shown hereunder are the same as those after STEP S4 shown in FIG. 4 and therefore, the detailed explanations will be omitted.

As described above, according to the present invention, in the image printing system comprising a digital still camera and such an image printer as a color digital copier and the link in one unit, serviceability and efficiency of the system can be improved by use of an extra-copy designation sheet for designation of various information. Further, it is also possible to improve the management of extra-copy printing arid mace the distribution of extra-copies easy by printing and outputting extra-copies for a plurality of users by sorting them for each bin and transmitting image data for extra-copies of a plurality of users to image displays owned by users. Further, it is also enabled to reissue an extra-copy designation sheet when use of an ectra-copy designation sheet is desirable.

In addition, a user is enabled to directly designate the output to any image printer in the system and it is possible to obtain the output result conforming to the demand of a user. Further, a user is also enabled to designate image quality and image size to individual image data and thus, the output result desired by a user can be obtained.

Further, as a user group can be registered in advance and reflected on an extra-copy designation sheet, it becomes simple to perform the user management. As the extra-copy printing is performed in a unit of group that is fixed to some extent in many cases, it is very effective to define user groups in this sense as in the present invention.

The embodiments of the present invention have been described in the above. However, the present invention is not limited to these embodiments and needless to say, various modifications and changes may be made without departing from the spirit and scope of the invention. For example, although color digital copiers, color ink-jet printers, color sublimation type printers are assumed as image printers that are connected to this system via a network in the embodiments described above, needless to say, printers that can be used are not limited to those printers mentioned above.

As described above in detail, according to the present invention, an image printing system and an image printing method capable of realizing a structure combining color copiers and a digital still camera in one unit and enabling the prescribed editing process and printing rapidly and easily by the simple operation without requiring special knowledge.

What is claimed is:

1. An image printing method according to an image output system comprising a digital still camera for taking images and converting the taken images into digital data; a memory for storing the digital data; a first digital copier including a scanner to read document images, a print device for printing visible images read by the scanner on recording media and a sorter for sorting the recording media printed the visible images thereon; and a plurality of second digital copiers connected to the first digital copier by way of a network, the method comprising the following steps:

receiving electronic information stored in the memory;

producing a designation sheet to designate image output conditions based on the electronic information received;

entering user data into the designation sheet;

analyzing the contents of the user data on the designation sheet which were read and entered by the scanner; and printing visible images based on the electronic information received by at least one of said plurality of second digital copiers according to the designations relative to the user data entered in the designation sheet, and sorting and outputting the images.

2. An image printing method using an image printing system comprising a digital still camera which obtains image data by converting a taken subject image into electric signals, a digital copier connected to the digital still camera by ways of a communication interface and a sorter which is connected to the digital copier and sort images to be printout, comprising the following steps:

reading image data with the digital copier from the digital still camera;

producing, based on the image data, an image output designation sheet which designates the output of the image data to recording media;

setting conditions for the image output on the image output designation sheet; and recognizing conditions for the image output designation sheet, based on conditions set for the image output, wherein the image data from the digital still camera are output from the digital copier and are sorted by the sorter.

3. An image printing system comprising:

a digital still camera for taking images and converting the taken images into digital data;

a memory for storing the digital data;

a digital copier including a print device for printing visible images based on the digital data on recording media, a sorter for sorting the recording media printed with the visible images thereon and a scanner for reading information on a designation sheet, wherein the designation sheet includes a first information for designating visible images to be printed on the recording media out of the images corresponding to the digital data stored in the memory, a second information for designating the number of the recording media on which visible images are to be printed by the print device and a third information for sorting the recording media printed with the visible images thereon; and a controller for controlling the digital copier so as to print the visible images of the digital data stored in the memory on the recording media in accordance with the first and second information, and sort the recording media printed with the visible images thereon in accordance with the third information.

4. An image printing system according to claim 3, further comprising:

a plurality of second digital copiers connected to the first digital copier by way of a network.

5. An image printing system according to claim 4, wherein the designation sheet further includes a fourth information for designating one of the plurality of second digital copiers to output visible images on the recording media.

6. An image printing system according to claim 4, wherein the designation sheet further includes an ID number input portion into which a user ID number is entered.

7. An image printing system according to claim 6, wherein the digital copier further includes storage means for storing a serial number of the designation sheet issued uniquely from a date and time when the designation sheet is produced and a user ID number.

8. An image output means according to claim 6, wherein the digital copier further includes group registration means for registering prescribed groups requesting the image output, storage means for storing ID numbers of those groups and users, and group designation means for designating groups requesting the image output when producing the designation sheet.

9. An image printing system according to claim 3, wherein the designation sheet further includes an image size entry portion for designating a size of output image taken by the digital still camera to be output.

10. An image printing system according to claim 3, wherein the designation sheet further includes an image quality entry portion for designating quality of an output image taken by the digital still camera.

11. An image printing system comprising:

a digital still camera for taking images and converting the taken images into digital data;

a memory for storing the digital data;

a printer for printing visible images based on the digital data on recording media;

a sorter for sorting the recording media printed with the visible images thereon;

a scanner for reading information on a designation sheet, wherein the designation sheet includes a first information for designating visible images to be printed on the recording media out of the images corresponding to the digital data stored in the memory, a second information for designating the number of the recording media on which the visible images are to be printed by the printer and a third information for sorting the recording media printed with the visible images thereon by the sorter; and a controller for controlling the printer so as to print the visible images of the digital data stored in the memory on the recording media in accordance with the first and second information, and sort the recording media printed with the visible images thereon in accordance with the third information.

12. The image printing system of claim 11, wherein said designation sheet comprises:

a user identification input portion;

a bin output selection portion;

an image index portion;

an e-mail delivery selection portion; and an extra-copy check portion, wherein said bin output selection portion and said e-mail delivery selection portion indicate a delivery of said visible images, the image index portion indicates whether to print image data taken by said digital still camera in a reduced image, and said extra-copy check portion indicates desired extra-copy printing.

* * * * *